United States Patent [19]
Wakamatsu et al.

[11] 3,713,355
[45] Jan. 30, 1973

[54] AUTOMATIC TRANSMISSION CONTROL SYSTEM FOR AUTOMATIC TRANSMISSIONS ON VEHICLES

[75] Inventors: Hisato Wakamatsu, Kariya; Akira Kitano, Nagoya; Hisasi Kawai, Toyohashi, all of Japan

[73] Assignee: Nippondenso Kabushiki Kaisha, Kariya-shi, Japan

[22] Filed: July 24, 1970

[21] Appl. No.: 58,080

Related U.S. Application Data

[63] Continuation-in-part of Ser. No. 34,098, May 4, 1970.

[30] Foreign Application Priority Data

Aug. 6, 1969 Japan..............................44/62568

[52] U.S. Cl...................................74/866, 74/752 D
[51] Int. Cl..........................B60k 21/00, F16h 5/42
[58] Field of Search......................................74/866

[56] References Cited

UNITED STATES PATENTS 3,448,640  6/1969  Nelson ..................................74/866

Primary Examiner—Arthur T. McKeon
Attorney—Cushman, Darby & Cushman

[57] ABSTRACT

An automatic transmission control system for automatic transmissions on vehicles, which comprises a vehicle speed detector to produce an output signal at frequencies proportional to the vehicle speed, an AC-DC converter to produce an analog signal by converting the output signal of the vehicle speed detector, an engine load detector to produce an output signal corresponding to the engine load, a gear shift signal generator circuit to generate a shifting signal by detecting a shifting point from the output signals of the AC-DC converter and the engine load detector, and a memory normally producing an output signal in accordance with the gear shift signal from the gear shift signal generator circuit for shifting the gear position of the transmission gear-shifting mechanism. If the engine throttle valve is closed, the output signal of the memory is locked, irrespective of subsequent changes of the gear shift signal until the vehicle speed is reduced to a predetermined low value. A low speed detector produces an output signal when the vehicle speed is reduced to the predetermined low speed, thereby releasing the locked state of the memory.

5 Claims, 11 Drawing Figures

AUTOMATIC TRANSMISSION CONTROL SYSTEM FOR AUTOMATIC TRANSMISSIONS ON VEHICLES

This application is a continuation-in-part of our commonly assigned copending application Ser. No. 34,098 filed May 4, 1970; and is related to our commonly assigned copending applications Ser. No. 35,327 filed May 5, 1970; now U.S. Pat. no. 3,662,625; Ser. No. 53,909 filed July 10, 1970; and Ser. No. 60,279 filed Aug. 3, 1970.

This invention relates to improvements in automatic transmission control systems for automatic automotive transmissions and, more particularly, to automatic transmission control systems to automatically shift the gear position of the transmission gear shifting mechanism in accordance with the speed of the travelling vehicle and the load of the engine mounted on the travelling vehicle.

The usual automatic automotive transmissions, for example a four-forward-speed automatic transmission for buses, employ an automatic transmission control system, which automatically controls the transmission. Typically, the automatic transmission control system provides a gear shift signal in accordance with an output of a DC generator of a vehicle speed detector and an output of a throttle switch producing an electric output signal corresponding to the position of the throttle of the engine, that is, in accordance with the vehicle speed and the engine load, in keeping with a predetermined gear-shifting characteristic (shifting points), thereby bringing a specified one of the first-speed, second-speed, third-speed, fourth-speed and reverse-speed gears of the multi-position gear-shifting mechanism into mesh with the engine side gear (i.e., the gear driven by the engine, as shown for example in FIG. 1 of the Shirai et al. U. S. Pat. No. 3,640,152) through a fluid coupling means, usually referred to as a hydraulic torque converter. The construction of the above automatic transmission control system, which is used for four-forward-speed automatic transmissions on buses, will now be described in more detail. The aforementioned DC generator to detect the vehicle speed has its output terminal commonly connected to one end of each of the first-to-second, second-to-third, and third-to-fourth gear-shift signal generating relay coils having the other ends thereof respectively connected to different voltage terminals. The voltages on these voltage terminals are successively switched by the aforementioned throttle switch, which is of a multi-state construction, to successively actuate the first-to-second, second-to-third and third-to-fourth gear-shift signal generating relays so as to produce successive first-to-second, second-to-third and third-to-fourth gear-shift signals, thereby successively bringing the second-speed, third-speed and fourth-speed gears of the gear-shifting mechanism into mesh with the engine side gear and thus successively shifting the gear-shifting mechanism. The hunting due to upshifting and downshifting at respective shifting points is prevented from occurring while the driver is depressing the accelerator pedal, by adjusting the hysteresis characteristic of the relays, i.e., the force on the movable piece or spring of the relays, by means of a hysteresis setter. In case the vehicle travelling with the transmission placed, for instance, in the fourth speed gear position is temporarily stopped at a crossing, a separately provided locking relay is actuated in response to releasing the accelerator pedal to lock the fourth-speed gear position of the transmission, and by subsequently applying the engine brake the vehicle speed is gradually decreased until the vehicle stops with the transmission held in the fourth. As the retained fourth-speed gear position is shifted to the first-speed gear position when re-starting the vehicle by re-pressing the accelerator pedal, the re-starting involves shock and a delay time due to the downshifting. In order to avoid such downshifting at the time of restarting the vehicle, the first-to-second gear-shift signal generating relay is arranged to be rendered inoperative when the vehicle speed is reduced to a predetermined value, thus releasing the locked transmission and downshifting it from the fourth into the first.

With the conventional automatic transmission control system of the type just described, however, a plurality of relays are involved which are actuated by the output of the DC generator of the vehicle speed detector, so that the capacitance, weight and size of the DC generator are inevitably considerable, leading to high manufacturing costs. Also, the system itself has a rather short service life due to such problems as the durability of brushes and commutators involved. Further, the manufacture of the relays is subject to various restrictions in that they should be controlled with a voltage of, for instance, about 12 volts, which is the output of the DC generator and which corresponds to about 2 km/h of the vehicle speed, and at which they are actuated to release the locked gear position and shift the transmission into the first when the speed of the travelling vehicle with the transmission held in the locked gear position is reduced to about 2 km/h.

Thus, the manufacture is very difficult and reliable operation cannot be easily ensured.

An object of the invention is to overcome the above drawbacks by the provision of an automatic transmission control system for automatic automotive transmissions, which comprises a vehicle speed detector to produce an output signal at frequencies proportional to the vehicle speed, an AC-DC converter to produce an analog signal by converting the digital output signal of the vehicle speed detector, an engine load detector to produce an electric output signal corresponding to the engine throttle opening or engine intake negative pressure, a gear-shift signal generator circuit to generate a shifting signal by detecting a shifting point from the output signals of the AC-DC converter and the engine load detector, a memory adopted to normally provide an output corresponding to the output of the gear-shift signal generator circuit and lock such output corresponding to the output of the gear-shift signal generator circuit previous to the appearance of a "cut-off" signal indicating the "cut-off" state of the engine throttle valve in case such "cut-off" signal appears from the engine load detector, a low vehicle speed detector using a charging-and-discharging capacitor and a constant-voltage element to produce an output signal by detecting a predetermined low vehicle speed from the output signal of the first-said vehicle speed detector for releasing the output-locking state of the memory, and a means to execute the shifting of the transmission gear-shifting mechanism in accordance with the output signal of the memory, and which enables using a small-size, lightweight and inexpensive generator such as an AC generator for the vehicle speed detector, ensuring the detection of any slight or low predetermined vehicle speed through the small-size generator, extremely reducing the size and manufacturing cost of the whole system and expecting reliable operation of the system.

According to the invention, excellent effects are featured, that as there are provided a vehicle speed detector to produce an output signal at frequencies proportional to the vehicle speed, an AC-DC converter to produce an analog signal by converting the digital output signal of the vehicle speed detector and an engine load detector to produce an electric output signal corresponding to the engine throttle opening or engine intake negative pressure for detection of a shifting point from the output signals produced by the respective AC-DC converter and the engine load detector and impressed on the gear-shift generator circuit to produce a gear-shift signal, a generator other than a DC generator, for example, an AC generator or a pulse generator, which is smaller in size, has a lower capacitance, and is lighter in weight and lower in cost as compared to the DC generator, may be used for the vehicle speed detector. Other excellent effects featured by the invention are that as there is provided a low vehicle speed detector using a charging-and-discharging capacitor and a constant-voltage element to produce an output signal by detecting a predetermined slight or low speed from the output signal of the first-mentioned vehicle speed detector for releasing the output-locking state of the memory, any low predetermined vehicle speed may be detected from the frequency of the output signal of the first-mentioned vehicle speed detector irrespective of the level of the output signal thereof. In this respect, this detector can also use a generator other than the DC generator such as AC generator and pulse generator, which requires small size, low capacitance, and light weight and leads to lower costs as compared to the DC generator. Further excellent effects featured by the invention are that the system as a whole is extremely small in size, light in weight and simplified in construction as compared with the conventional system having a vehicle speed detector using a DC generator and a plurality of relays, that engine braking may be effectively applied, and that extremely reliable action of downshifting the transmission into a lower gear position immediately before the vehicle is stopped by applying the engine brake for preventing shock and time delay at the time of re-starting the vehicle may be ensured. Still further excellent effects featured by the invention are that the operating point for releasing the output-locking state of the memory, that is, the preset low vehicle speed, may be readily changed at any time by merely changing the time constant for charging the capacitor and the constant voltage for the constant-voltage element in the low vehicle speed detector without giving rise to various problems in the conventional system using relays.

The above and other objects, features and advantages of the invention will be apparent from the following detailed description of the invention with reference to the accompanying drawings, in which.

Figure 1:
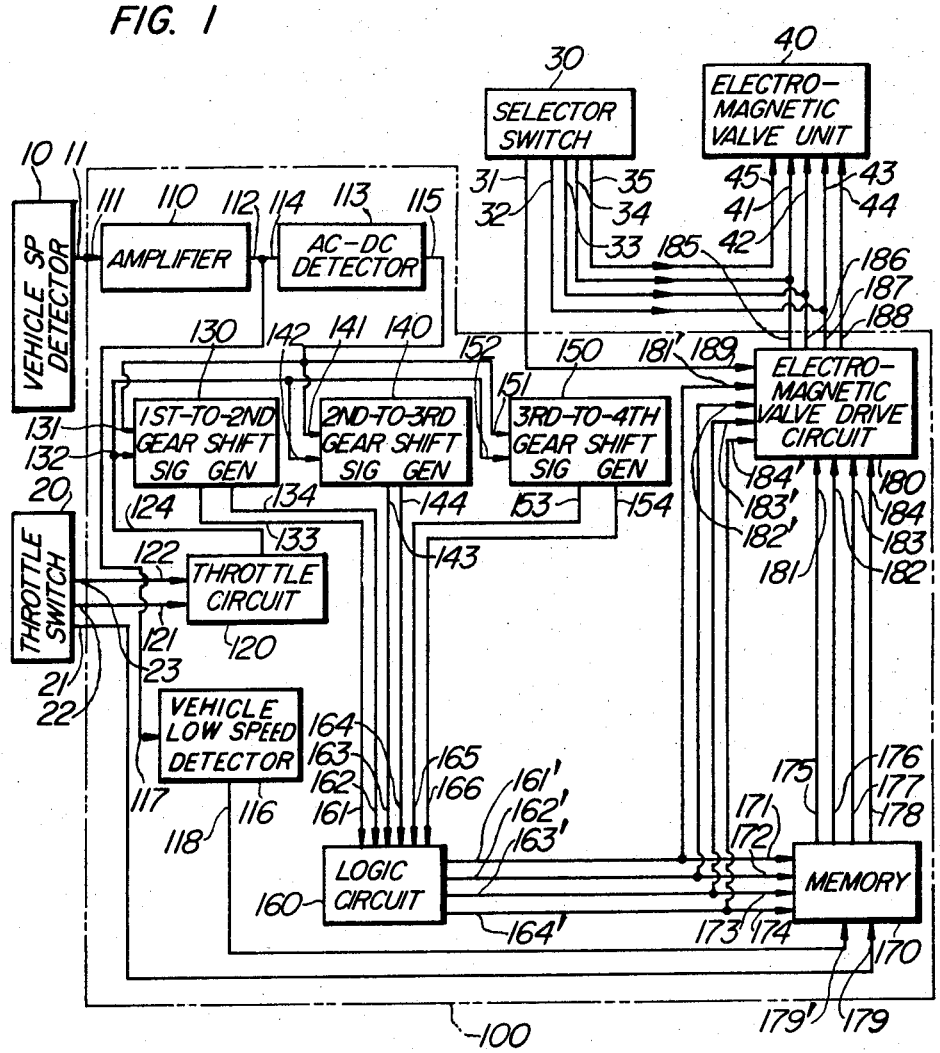
FIG. 1 is a block diagram outlining an automatic transmission control system for automatic automotive transmissions embodying the invention.
Figure 11:
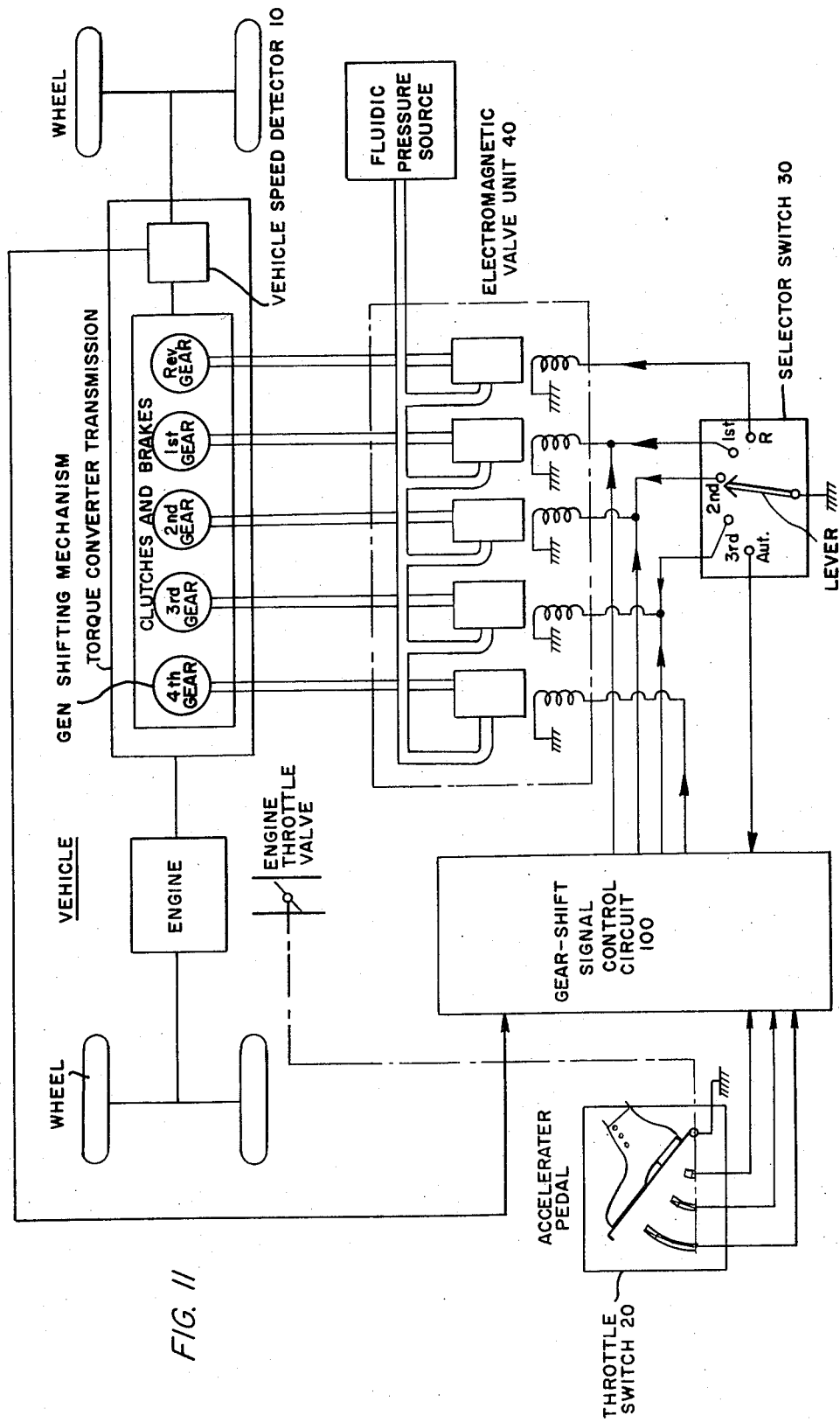
FIG. 11 is a diagrammatic general layout of the whole vehicular system.

A preferred embodiment of the automatic transmission control system for automatic automotive transmissions according to the invention is shown in FIG. 1 in which many of the blocks and details of which are like those shown and described in our above-mentioned copending applications. Referring to the figure, numeral 10 designates a vehicle speed detector consisting of an AC generator, numeral 20 a throttle switch, numeral 30 a selecter switch, and numeral 40 an electromagnetic valve unit. FIG. 11 shows the general vehicular layout of the foregoing with a gear-shift signal control circuit 100 detailed in FIG. 1 as comprising an amplifier 110, an AC-DC converter 113, a slight or low vehicle speed detector 116, a throttle circuit 120, a first-to-second gear-shift signal generator 130 to generate a gear-shift signal by detecting a shifting point for the gear-shifting from the first into the second speed gear, a second-to-third gear-shift signal generator 140 to generate a gear-shift signal by detecting a shifting point for the gear-shifting from the second into the third speed gear, a third-to-fourth gear-shift signal generator 150 to generate a gear-shift signal by detecting a shifting point for the gear-shifting from the third into the fourth speed gear, a logic circuit 160, a memory 170, and an electromagnetic valve drive 180.

The vehicle speed detector 10 has its output terminal 11 connected to an input terminal 111 of the amplifier 110. The throttle switch 20 has output terminals 21, 22 and 23, one of which, namely the output terminal 21, is connected to an input terminal 179 of the memory 170, while the other output terminals 22 and 23 are connected to respective input terminals 121 and 122 of the throttle circuit 120. The amplifier 110 has its output terminal 112 connected to both an input terminal 114 of the AC-DC converter 113 and an input terminal 117 of the low vehicle speed detector 116. The AC-DC converter 113 has its output terminal 115 connected to input terminals 131, 141 and 151 of the respective first-to-second, second-to-third and third-to-fourth gear-shift signal generators 130, 140 and 150. The low vehicle speed detector 116 has its output terminal 118 connected to an input terminal 179' of the memory 170. The throttle circuit 120 has its output terminal 124 connected to input terminals 132, 142 and 152 of the first-to-second, second-to-third and third-to-fourth gear-shift signal generators 130, 140 and 150. The firstto-second gear-shift signal generator 130 has its output terminals 133 and 134 connected to respective input terminals 161 and 162 of the logic circuit 160. The second-to-third gear-shift signal generator 140 has its output terminals 143 and 144 connected to respective input terminals 163 and 164 of the logic circuit 160. The third-to-fourth gearshift signal generator 150 has its output terminals 153 and 154 connected to respective input terminals 165 and 166 of the logic circuit 160. The logic circuit 160 has its output terminals 161', 162', 163' and 164' connected to respective input terminals 171, 172, 173 and 174 of the memory 170, whose output terminals 175, 176, 177 and 178 are connected to respective input terminals 181, 182, 183 and 184 of the electromagnetic valve drive 180 having its output terminals 185, 186, 187 and 188 connected to respective input terminals 41, 42, 43 and 44 of the electromagnetic valve unit 40. The selector switch 30 has output terminals 31 to 35, one of which, namely output terminal 31, is connected to an input terminal 189 of the electromagnetic valve drive 180, other output terminals 32, 33 and 34 of which are connected to respective input terminals 41, 42 and 43 of the electromagnetic valve unit 40, and the remaining output terminal 35 of which is connected to an input terminal 45 of the electromagnetic valve unit 40. It is to be understood that the power supply and power supply circuit are omitted in the figure.

Various essential parts of the system described above together with the operation thereof will now be described individually.

The vehicle speed detector 10, which may be attached to a cable outlet provided in the vehicle or mounted within the gear-shifting mechanism of the transmission, generates an AC output voltage at frequencies varying in proportion to the vehicle speed at the output terminal 11.

The amplifier 110 is a Class C amplifier to amplify the AC voltage produced at the output terminal 11 of the vehicle speed detector 10.

The AC-DC converter 113 may be similar to the digital-analog converter shown in our prior applications mentioned above and as in FIG. 4 of the Wakamatsu et al U.S. Pat. No. 3,507,544, and produces at the output terminal 115 a DC analog output at levels varying in accordance with the frequency of the AC digital output of the amplifier 110.

Figure 2:
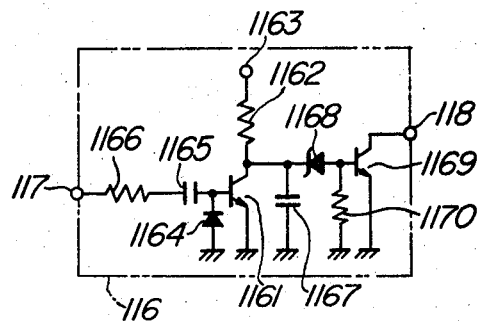
FIG. 2 is a circuit diagram of an example of the low vehicle speed detector in the system of FIG. 1.
Figure 3:
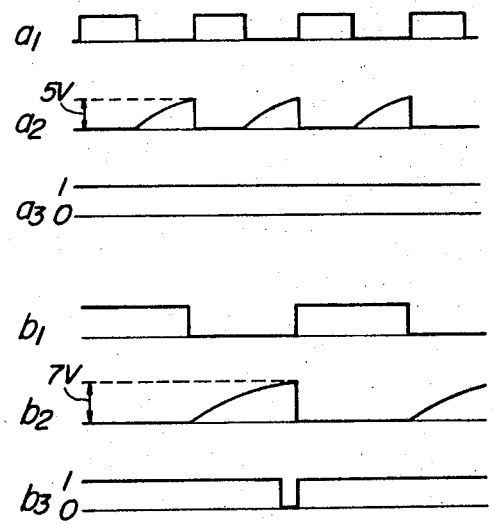
FIG. 3 is a waveform chart to illustrate the operation of the low vehicle speed detector of FIG. 2.

The slight or low vehicle speed detector 116 is of a construction as shown in FIG. 2. It comprises a transistor 1161 having its emitter grounded, a resistor 1162 connected between the collector of the transistor 1161 and a power supply terminal 1163 (connected to a power supply of, for instance, 12 volts), a diode 1164 having its negative pole connected to the base of the transistor 1161 and its positive pole grounded, a capacitor 1165 inserted between the base of the transistor 1161 and a resistor 1166 connected to the input terminal 117, a capacitor 1167 inserted between the collector of the transistor 1161 and the ground, a constant-voltage diode 1168 having its negative pole connected to the collector of the transistor 1161, a transistor 1169 having its emitter grounded, its base connected to the positive pole of the constant voltage diode 1168 and its collector connected to the output terminal 118, and a resistor 1170 connected between the base of the transistor 1169 and the ground. In operation, if no signal is present at the input terminal 117, the transistor 1161 is "off" and its collector voltage is substantially equal to the voltage (12 volts) on the power supply terminal 1163, so that current is present in the constant-voltage diode 1168 (with a Zener voltage of 7 volts) and the transistor 1169 is "on" rendering the potential on the output terminal 118 substantially ground potential. When an AC signal or a square-wave signal is impressed on the input terminal 117, the state of the transistor 1161 is changed into conduction and then non-conduction accordingly. When the transistor 1161 is cut off, the capacitor 1167 starts to be charged through the resistor 1162, so that the voltage on the source side terminal of the capacitor 1167 gradually builds up according to the time constant determined by the resistance of the resistor 1162 and the capacitance of the capacitor 1167 until a saturation voltage is reached. As soon as the transistor 1161 is triggered, the charge accumulated on the capacitor 1167 is instantaneously discharged through the collector-emitter path of the transistor 1161. If, at this instant, the time taken from the instant of cutting-off of the transistor 1161, that is from the start of charging of the capacitor 1167, until the potential on the source side terminal of the capacitor 1167 exceeds the Zener voltage of the constant-voltage diode 1168 is longer than the time taken from the cutting-off of the transistor 1161 till re-triggering thereof to discharge the capacitor 1167, the voltage on the source side terminal of the capacitor 1167 never becomes higher than the Zener voltage of the constant-voltage diode 1168 causing no current therethrough, so that the transistor 1169 remains "off." On the other hand, if the time taken from the instant of cutting-off of the transistor 1161 to charge the capacitor 1167 till the instant that the voltage on the positive side terminal of the capacitor exceeds the Zener voltage on the constant-voltage diode 1168 is shorter than the time taken from the instant of cutting-off of the transistor 1161 till the instant of re-triggering of the transistor 1161 to discharge the capacitor 1167, current is caused to pass through the constant-voltage diode 1168 to trigger the transistor 1169, which thus carries current till the instant of re-triggering of the transistor 1161 to discharge the capacitor 1167. In other words, if the time period from the cutting-off till the re-triggering of the transistor 1161 is longer than a predetermined time period, the transistor 1169 is triggered, whereas if it is shorter than the predetermined time period, the transistor 1169 is not triggered. This means that the transistor 1169 is triggered if the frequency of the pulse input to the input terminal 117 is lower than a predetermined frequency, but it is not triggered with a frequency higher than the predetermined frequency, assuming that the ratio between the hill and valley portions of input is always constant. The mode of the operation just described is illustrated in FIG. 3. In the Figure, $a_1$ and $b_1$ designate square-wave inputs to the input terminal 117, with the input $a_1$ at a frequency higher than that of the input $b_1$. Indexes $a_2$ and $b_2$ designate corresponding waveforms of the voltage on the source side terminal of the capacitor 1167, that is, the collector voltage on the transistor 1161 which assumes respective values of 5 volts and 7 volts at the time of re-triggering of the transistor 1161.

Indexes $a_3$ and $b_3$ designate corresponding waveforms of the collector voltage on the transistor 1169, with level "1" corresponding to the non-conduction state of the transistor 1169 and level "0" to the conduction state thereof. Thus, with an input with the waveform $a_1$ waveforms $a_2$ and $a_3$ result, and with an input with the waveform $b_1$ waveforms $b_2$ and $b_3$ result. The time constant for the circuit of the resistor 1162 and the capacitor 1167 is preset such that output signal "0" is produced at the output terminal 118 if the frequency of the input signal to the input 117 is below a predetermined frequency corresponding to a vehicle speed of, for instance, 2 km/h, while output signal "1" is produced with an input at a frequency higher than the predetermined frequency.

Figure 4:
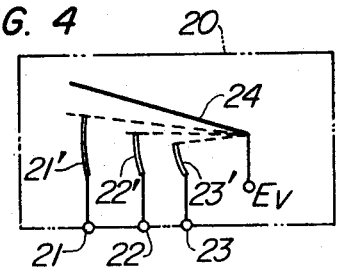
FIG. 4 is a schematic of an example of the throttle switch in the system of FIG. 1.

The throttle switch 20 is of a multi-state construction as shown in FIG. 4. It comprises a movable contact or accelerator 24 coupled to the engine throttle (FIG. 11) and fixed contacts 21', 22' and 23'. The movable contact 24 contacts the fixed contacts 21', 22' and 23' successively as the throttle opening progressively increases when the accelerator pedal continues to be depressed. When the engine throttle valve opening is nearly, but not completely, closed, the movable contact 24 touches only the fixed contact 21' (this state of the throttle switch 20 is hereinafter referred to as the "light" state). When the engine throttle valve opening is intermediate, the movable contact 24 touches the fixed contacts 21' and 22' (this is hereinafter referred to as the "normal" state of the throttle switch 20). When the engine throttle valve opening is at its utmost, the movable contact 24 touches all the fixed contacts 21', 22' and 23' (this is hereinafter referred to as the "full" state of the throttle switch 20). When the engine throttle valve is completely closed, the movable contact 24 touches none of the fixed contacts 21', 22' and 23' (this is hereinafter referred to as the "idle" state of the throttle switch 20). On the movable contact 24 is applied a constant voltage $E_v$.

Figure 5:
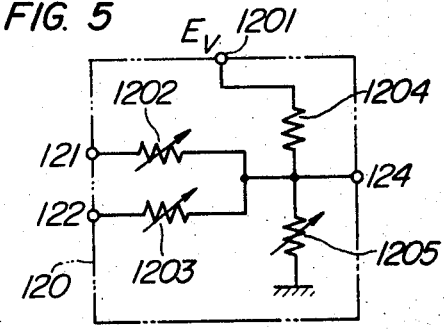
FIG. 5 is a circuit diagram of an example of the throttle circuit in the system of FIG. 1.

The throttle circuit 120 is of a construction as shown in FIG. 5. It comprises a terminal 1201, on which is applied the voltage $E_v$, a variable resistor 1202 connected between the input terminal 121 and the output terminal 124, a variable resistor 1203 connected between the input terminal 122 and the output terminal 124, a resistor 1204 connected between the terminal 1201 and the output terminal 124, and a variable resistor 1205 connected between the ground and the output terminal 124. In operation, when a signal ($E_v$) is absent at the input terminals 121 and 122, the voltage $E_1$ at the output terminal 124 is given as:

$$E_1 = \frac{R_1}{R + R_1} E_v \quad (1)$$

where R is the resistance of the resistor 1204 and $R_1$ is the resistance of the variable resistor 1205. When the throttle switch 20 is switched over to the "normal" state, as the accelerator pedal is being depressed a signal ($E_v$) appears at the input terminal 121, and a corresponding voltage $E_2$ at the output terminal 124 becomes:

$$E_2 = \frac{R_1}{R_1 + R//R_2} E_v \quad (2)$$

where $R_2$ is the resistance of the variable resistor 1202 and $R//R_2$ means the parallel resistance of R and $R_2$. As the accelerator is fully depressed, the throttle switch 20 is switched over to the "full" state, causing a signal ($E_v$) to appear at both the input terminals 121 and 122. The voltage $E_3$ at the output terminal 124 at this time is:

$$E_3 = \frac{R_1}{R_1 + R//R_2//R_3} E_v \quad (3)$$

where $R_3$ is the resistance of the resistor 1203 and $R//R_2//R_3$ is the parallel resistance of R, $R_2$ and $R_3$. The voltage at the output terminal 124 thus assumes the successive values $E_1$, $E_2$ and $E_3$ in correspondence to the successively changing "light," "normal" and "full" states of the throttle switch 20.

Figure 6:
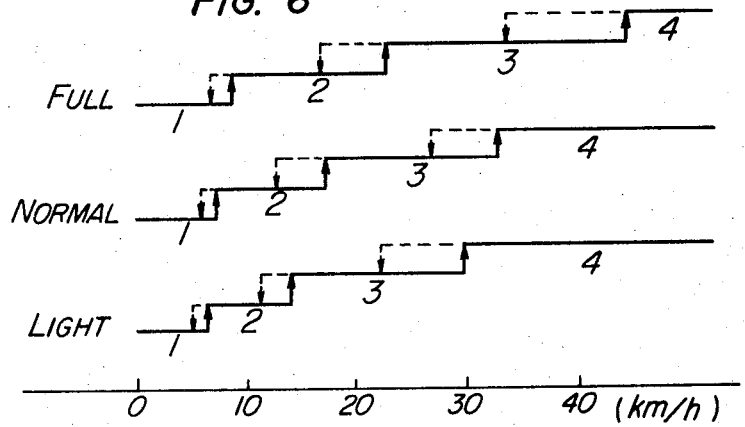
FIG. 6 shows the transmission characteristic of the system of FIG. 1.
Figure 7:
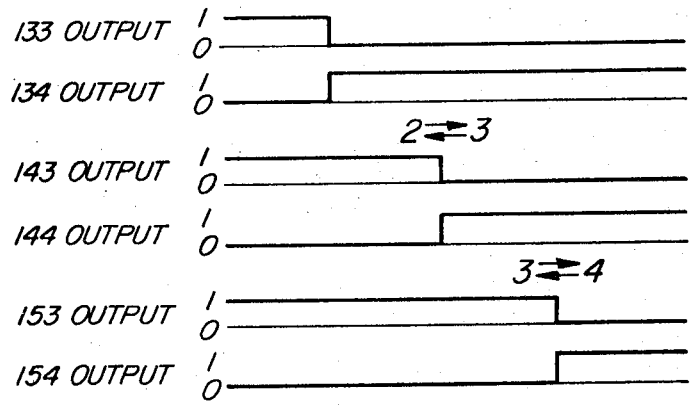
FIG. 7 shows outputs of three gear-shift signal generators in the system of FIG. 1.

The first-to-second, second-to-third and third-to-fourth gear-shift generators 130, 140 and 150 (each of which is constructed as shown in FIG. 6 or 14 of our above-mentioned application Ser. No. 53,909) respectively compare the signal (voltage) proportional to the vehicle speed produced by the AC-DC converter and the signal (voltage) indicating the throttle state produced by the throttle circuit 120, and their circuit parameters are preset such that a transmission characteristic as shown in FIG. 6 (except for the "idle" state) may be obtained. In FIG. 6, the abscissa represents the vehicle speed (in km/h) and the ordinate represents the "light," "normal" and "full" states of the throttle switch 20. The arrows directed from line segments 1 to line segments 2 and vice versa, from line segments 2 to line segments 3 and vice versa and from line segments 3 to line segments 4 and vice versa correspond to respective shifting points for the gear-shifting from the first into the second and vice versa, from the second into the third and vice versa and from the third into the fourth and vice versa respectively. The roles of causing the gear-shifting from the first into the second and vice versa are taken by the first-to-second gear-shift signal generator 130, the roles of causing the gear-shifting from the second into the third and vice versa are taken by the second-to-third gear-shift signal generator 140, and the roles of causing the gear-shifting from the third into the fourth and vice versa are taken by the third-to-fourth gear-shift signal generator 150. These gear-shift signal generators each comprise a comparator circuit, a feedback circuit and a phase inverter all as detailed in FIGS. 6 and 14 of our above-mentioned application Ser. No. 53,909. In operation, when the shifting point for the gear-shifting from the first into the second speed gear is reached, there does appear a signal voltage at the output terminal 134 of the first-to-second gear-shift signal generator 130 (the presence and absence of the signal voltage are hereinafter expressed by the respective symbolic forms of "1" and "0"). On the other hand, when the shifting point for the gear-shifting from the second into the first speed gear is reached, the states of the output terminals 133 and 134 are respectively "1" and "0." Similarly, at the second-to-third gear-shifting point the states of the output terminals 143 and 144 of the second-to-third gear-shift signal generator 140 are respectively "0" and " 1," and conversely at the third-to-second gear-shifting point the second-to-third gear-shift signal generator 140 comes up with its output terminals 143 and 144 respectively being "1" and "0." At this time, the output terminals 133 and 134 are respectively "0" and "1." Likewise, at the third-to-fourth gear-shifting point the output terminals 153 and 154 of the third-to-fourth gear-shift signal generator 150 are respectively "0" and "1," and conversely at the fourth-to-third gear-shifting point they are respectively "1" and "0." At this time, the output terminals 133 and 134 are "0" and the output terminals 143 and 144 are "1." The operation just described is illustrated in FIG. 7. In the Figure, $1 \rightleftarrows 2$, $2 \rightleftarrows 3$ and $3 \rightleftarrows 4$ respectively indicate the first-to/from-second, second-to/from-third and third-to/from-fourth gearshifting points, and the ordinate represents the state of the output terminals 133, 134, 143, 144, 153 and 154, with "1" corresponding to the presence of the signal and "0" to the absence of the signal.

Figure 8:
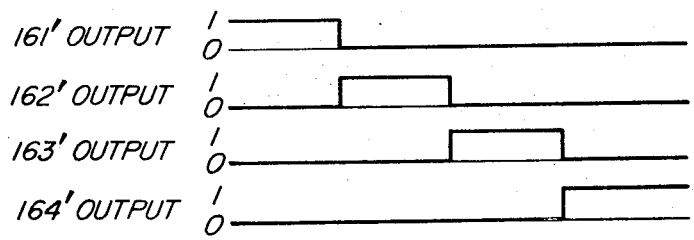
FIG. 8 shows outputs of the logic circuit in the system of FIG. 1.

The logic circuit 160 receives the signals from the first-to-second, second-to-third and third-to-fourth gear-shift signal generators 130, 140 and 150 at its input terminals 161 to 166. With the signal as shown in FIG. 7 impressed on the respective input terminals 161 to 166, the corresponding states of the output terminals 161', 162', 163' and 164' of the logic circuit 160 are as shown in FIG. 8. When the first speed gear is coupled, the output terminal 161' is "1" and the other output terminal 162', 163' and 164' are "0." When the second speed gear is coupled, the output terminal 162' is "1" and the other output terminals 161', 163' and 164' are "0." When the third speed gear is coupled, the output terminal 163' is "1" and the other output terminals 161', 162' and 164' are "0." Finally, when the fourth speed gear is coupled, the output terminal 164' is "1" and the other output terminals 161', 162' and 163' are "0."

Figure 9:
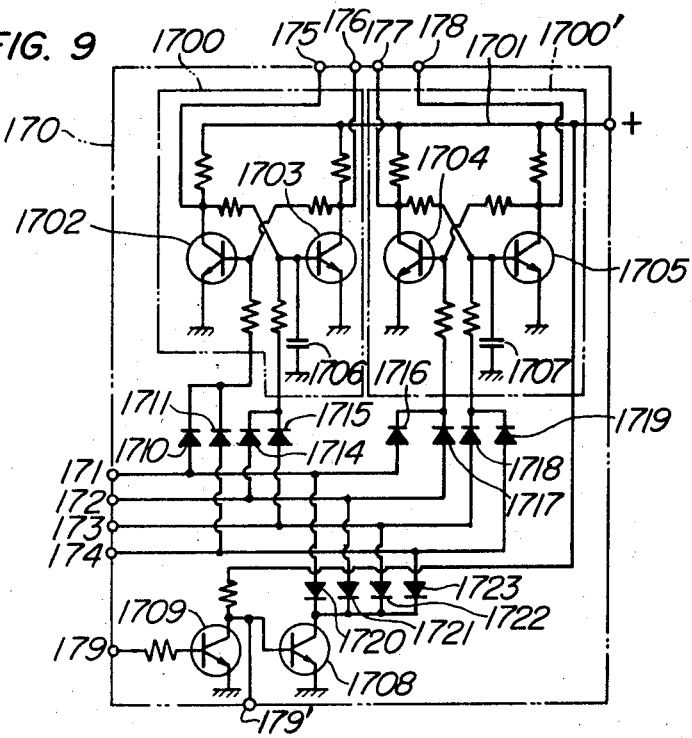
FIG. 9 is a circuit diagram of an example of the memory in the system of FIG. 1.

The memory 170 is of a construction as shown in FIG. 9. It includes two bistable multi-vibrators 1700 and 1700', which are well known in the art, and have a common lead 1701 to a power supply. The bistable multi-vibrator 1700 has a pair of transistors 1702 and 1703, and the other bistable multi-vibrator 1700' also has a pair of transistors 1704 and 1705. These multi-vibrators have respective capacitors 1706 and 1707 connected to the base of the respective transistors 1703 and 1705, whereby upon impression of a voltage on the lead 1701 only the transistors 1702 and 1704 are triggered and the transistors 1703 and 1705 are not triggered until a certain delay time has been passed. The memory also includes a transistor 1708, which has its emitter grounded, a transistor 1709, which has its emitter also grounded, its base connected through a resistor to the input terminal 179 and its collector connected to the input terminal 179', to the base of the transistor 1708 and through a resistor to the supply lead 1701, diodes 1710 and 1711, which have their negative poles connected through a common resistor to the base of the transistor 1702 and their positive poles connected to the respective input terminals 171 and 174, diodes 1714 and 1715, which have their negative poles connected through a common resistor to the base of the transistor 1703 and their positive poles connected to the respective input terminals 172 and 173, diodes 1716 and 1717, which have their negative poles connected through a common resistor to the base of the transistor 1704 and their positive poles connected to the respective input terminals 171 and 172, diodes 1718 and 1719, which have their negative poles connected through a common resistor to the base of the transistor 1705 and their positive poles connected to the respective input terminals 173 and 174, and diodes 1720 to 1723, which have their negative poles commonly connected to the collector of the transistor 1708 and their positive poles connected to the respective input terminals 171 to 174. In operation, when a power supply (not shown) is turned on, a voltage appears on the lead 1701 to trigger the transistors 1702 and 1704 while the transistors 1703 and 1705 are left "off" through the action of the capacitors 1706 and 1707 until a certain delay time is elapsed. Subsequently, when a signal (voltage) is impressed on the input terminal, the transistor 1709 is triggered while keeping the transistor 1708 "off." If the first speed signal enters the memory 170 in this state, that is, if a signal appears only at the input terminal 171 (with the other input terminals 172, 173 and 174 remaining "0"), the transistors 1702 and 1703 remain respectively "on" and "off," for the signal voltage is impressed through the diode 1710 on the base of the transistor 1702, and also remain respectively "on" and "off," for the signal voltage is impressed through the diode 1716 on the base of the transistor 1704. At this time, the output terminals 175 and 177 are "0" and the output terminals 176 and 178 are "1." Next, if the memory receives the second speed signal, at which time the input terminal 171 is switched to "0," the input terminal 172 is switched to "1," and the input terminals 173 and 174 remain "0," the transistor 1703 is triggered to cut off the transistor 1702, for current flows through the diode 1714 into the base of the transistor 1703, while the transistors 1704 and 1705 remain respectively "on" and "off," for current flows through the diode 1717 into the base of the transistor 1704. At this time, the output terminals 175 and 178 provide the signal "1" and the output terminals 176 and 177 provide the signal "0." Thirdly, if the memory receives the third speed signal, at which time the input terminal 172 is switched to "0," the input terminal 173 is switched to "1" and the input terminals 171 and 174 remain "0," the transistors 1702 and 1703 remain respectively "off" and "on," for current flows through the diode 1715 into the base of the transistor 1703, while the transistor 1705 is triggered to cut off the transistor 1704, for current flows through the diode 1718 into the base of the transistor 1705. At this time, the output terminals 175 and 177 provide the signal "1" and the output terminals 176 and 178 provide the signal "0." Finally, if the memory receives the fourth speed signal, at which time the input terminal 173 is switched to "0," the input terminal 174 is switched to "1" and the input terminals 171 and 172 remain "0," the transistor 1702 is triggered to cut off the transistor 1703, for current flows through the diode 1711 into the base of the transistor 1702, while the transistors 1704 and 1705 remain respectively "off" and "on," for current flows through the diode 1719 into the base of the transistor 1705. At this time, the output terminals 176 and 177 provide the signal "1" and the output terminals 175 and 178 provide the signal "0." The state of the memory terminals described above are tabulated as follows:

STATES OF INPUT AND OUTPUT TERMINALS OF THE MEMORY

| Speed Signal | Input Terminals 171, 172, 173 and 174 | Output Terminals 175 176 177 178 |
|---|---|---|
| First | "1" at terminal 171 and "0" at the rest | "0" "1" "0" "1" |
| Second | "1" at terminal 172 and "0" at the rest | "1" "0" "0" "1" |
| Third | "1" at terminal 173 and "0" at the rest | "1" "0" "1" "0" |
| Fourth | "1" at terminal 174 and "0" at the rest | "0" "1" "1" "0" |

When the vehicle is travelling with the transmission placed, for instance, in the third, the signal "1" is present at the input terminal 173 while the signal "0" is present at the other input terminals of the memory 170, so that the output terminals 175 and 177 are "1" and the output terminals 176 and 178 are "0." In this situation, if the accelerator is released, rendering the throttle switch 20 into the "idle" state, the signal at the input terminal 179 of the memory 170 becomes 0 (volts) to cut off the transistor 1709 and trigger the transistor 1708 so as to ground the input terminals 171 to 174 through the respective diodes 1720 to 1723 and the transistor 1708. Thus, the transistors continue to be "off" and the transistors 1703 and 1705 "on," so that the previous state of the output terminals 175 to 176 of the memory 170, that is, the third speed gear position of the transmission, is held unchanged irrespective of subsequent change of the state of the input terminals 171 to 174. It will thus be seen that engine braking may be effected without downshifting the transmission from the third. Although in the above situation, engine braking is effected when the vehicle is travelling with the transmission placed in the third, it may also be effected when the vehicle is travelling with the transmission placed in another position (first, second or fourth) without downshifting from that position which is in force when releasing the accelerator pedal to render the throttle switch 20 into the "idle" state, and by re-pressing the accelerator pedal a signal again appears at the input terminal 179 to trigger the transistor 1709 and hence cut off the transistor 1708, thus releasing the engine brake and recovering the accelerating state. When the throttle switch 20 is rendered into the "idle" state by releasing the accelerator pedal, the previous non-conduction and conduction states of the respective transistors 1709 and 1708 is maintained unless the accelerator pedal is re-depressed so that the previous position of the transmission is maintained until the vehicle speed is reduced to a low value. As the vehicle speed reduces, the output signals of the first-to-second, second-to-third and third-to-fourth gear-shift signal generators 130, 140 and 150 change as shown in FIG. 7 to change the output signals at the output terminals 161', 162', 163' and 164' of the logic circuit 160 in accordance with the transmission characteristic as shown in FIG. 6. For example, when the vehicle speed gets lower than 5 km/h, the first-speed signal appears, that is, the signal "1" appears only at the output terminal 133 of the first-to-second gear-shift signal generator 130 and the signal "0" appears at the other output terminals of the gear-shift signal generators. When the vehicle speed is further reduced down to 2 km/h, for instance, the low vehicle speed detector 116 is actuated to produce signal "0" at its output terminal 118. As a result, signal "0" is impressed on the input terminal 179' of the memory 170 to cut off the transistor 1708, whereupon the memory 170 receiving the first speed signal at its input terminals, namely signal "1" at the input terminal 171 and signal "0" at the input terminals 172, 173 and 174, begins to provide the first speed signal at its output terminals, namely signal "0" at the output terminals 175 and 177 and signal "1" at the output terminals 176 and 178, thus actuating the electromagnetic valve drive 180 to shift the transmission into the first speed gear. In this case, when the vehicle speed gets lower than 2 km/h, a pulse train as shown at $b_2$ in FIG. 3 is produced at the output terminal 118 of the low vehicle speed detector 116, and the downshifting into the first speed gear is executed at the first pulse.

Figure 10:
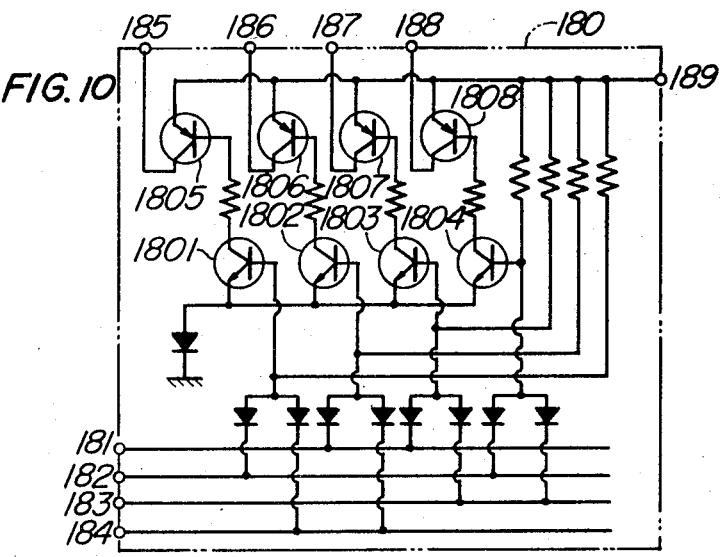
FIG. 10 is an example of the electromagnetic valve drive in the system of FIG. 1.

The electromagnetic valve drive 180 is of a construction as shown in FIG. 10. It comprises an AND circuit including transistors 1801 to 1804 and a power circuit including transistors 1805 to 1808.

Its input terminal 189 is connected through the contacts of the selector switch 30 to a power supply. In operation, if signal "1" is present at the input terminals 182 and 184 and signal "0" is present at the input terminals 181 and 183, only the transistor 1801 is "on" and the rest of the transistors of the AND circuit are "off." If signal "1" is present at the input terminals 181 and 184 and signal "0" is present at the input terminals 182 and 183, only the transistor 1802 is "on" and the rest of the transistors are "off." If signal "1" is present at the input terminals 181 and 183 and signal "0" is present at the input terminals 182 and 184, only the transistor 1803 is "on" and the rest of the transistors are "off." If signal "1" is present at the input terminals 182 and 183 and signal "0" is present at the input terminals 181 and 184, only the transistor 1804 is "on" and the rest of the transistors are "off." When any one of the transistors 1801 and 1804 in the AND circuit becomes "on," the corresponding one of the transistors 1805 to 1808 in the power circuit is triggered to supply power to the corresponding one of the output terminals 185 to 188.

The electromagnetic valve unit 40 is like the similar unit 40 in each of our above-mentioned applications and as shown in FIG. 11 herein has four electromagnetically operated on-off valves, namely first-speed, second-speed, third-speed and fourth-speed electromagnetic valves having respective solenoids, which are individually energized by power from the respective output terminals 185 to 188 of the electromagnetic valve drive 180.

The selector switch 30 is like the similar switch 30 in each of our aforesaid applications and as shown in FIG. 11 herein comprises five fixed contacts and a movable contact linked to a lever. By placing the lever in the "Automatic" position, an output voltage is fed from the output terminal 31 of the selector switch to the input terminal 189 of the electromagnetic valve drive 180 to render the electromagnetic valve drive 180 operative. This sets up the state for the automatic transmission. The manual shifting may be accomplished, independently of the automatic transmission control system, by placing the lever in any one of the "First," "Second," "Third" and "Reverse" positions, whereupon a voltage is produced at a corresponding one of the output terminals 34, 33, 32 and 35 to energize a corresponding one of the solenoids of the respective first-speed, second-speed, third-speed and reverse-speed electromagnetic valves of the electromagnetic valve unit 40, thereby placing the transmission in the corresponding gear position.

Although the embodiment described above is applied to the four-forward-position automatic transmission, the invention may of course be applied to the automatic transmission having two, three, five or more forward positions, and the number of the gear-shift signal generators depends upon the gear-shift range (shifting points) covered by the automatic transmission, to which the invention is applied. In case of the two-forward-position automatic transmission, only a single gear-shift signal generator is required and the logic circuit 160 may be dispensed with. Also, in place of the AC generator used as the vehicle speed detector 10, a pulse generator or a frequency generator, that is, any other means capable of producing an electric output signal at frequencies proportional to the vehicle speed, may be used as well. Further, though the embodiment described above uses a load detector circuit comprising the throttle switch 20 and the throttle circuit 120 for obtaining a voltage corresponding to the throttle opening, such load detector circuit may be replaced with the one that provides an electric signal corresponding to the engine intake negative pressure, which varies in accordance with the throttle opening.

What is claimed is:

1. An automatic transmission control system for vehicles having engines and using automatic transmission having gear-shifting mechanisms, comprising:
vehicle speed detector means for operative connection to said vehicle to produce an output signal at frequencies proportional to the vehicle speed,
AC-DC converter means connected to said detector means to convert the output signal of said vehicle speed detector into a corresponding analog signal,
engine load detector means for operative connection to the engine of said vehicle to produce an output signal corresponding to the engine throttle valve opening or engine intake negative pressure,
gear-shift signal generator circuit means connected to said AC-DC converter and load detector means to generate a gear-shift signal by detecting certain relationships between the output signals of said AC-DC converter means and said engine load detector means,
memory means connected to and producing an output signal in accordance with the output signal of said gear-shift signal generator circuit means
means connected between said load detector and memory means for causing the output signal of said memory means to be locked upon appearance from said engine load detector means of a signal indicating the "cut-off" state of the engine throttle valve,
vehicle low speed detector means connected between said speed detector and memory means and including a charging-and-discharging capacitor and a constant-voltage detection element for producing an output signal for releasing the output-locking state of said memory means by detecting a predetermined low vehicle speed from the output signal of said first-mentioned vehicle speed detector means, and
means connected to said memory means for operative connection to the automatic transmission of said vehicle to execute the shifting of the transmission gear-shifting mechanism thereof in accordance with the output signal of said memory means.

2. The automatic transmission control system according to claim 1, wherein said vehicle low speed detector means includes:
a first transistor circuit to receive the input signal from said first mentioned speed detector,
an integrating circuit including said capacitor and connected to receive the output of said first transistor circuit,
a constant-voltage diode as said constant-voltage detection element, and
a second transistor circuit connected to receive the output of said integrating circuit through said constant-voltage diode.

3. The automatic transmission control system according to claim 1, wherein said memory means includes:
two bistable multi-vibrator circuits having outputs connected to said shifting means and having inputs,
an input circuit connected between said inputs and the outputs of said gear-shift signal generator circuit means to produce a trigger signal for triggering said bistable multi-vibrators, and
a transistor circuit means connected between said input circuit and said vehicle low speed detector means to restrict the action of said input circuit by grounding said input circuit upon receipt of said output signal from said vehicle low speed detector means.

4. An automatic transmission control system for vehicles having engines with throttle valves and using automatic transmissions having gear-shifting mechanisms, comprising:
means including a vehicle speed detector for operative connection to a said vehicle for producing an output signal proportional to the vehicle speed,
engine load detector means for operative connection to the engine of said vehicle to produce an output signal corresponding to the engine load,
gear-shift signal generator means connected to said vehicle speed detector means and load detector means for generating output signals upon detecting certain gear-shift relationships between the aforesaid output signals thereof,
memory means connected to said gear-shift signal generator means for producing an output signal in accordance with the output signal thereof,
means connected between said load detector and memory means for causing the output signal of said memory means to be locked upon appearance from said engine load detector means of a signal indicating the "cut-off" state of the engine throttle valve, vehicle low speed detector means connected between said first mentioned speed detector and memory means for producing an output signal for releasing the output-locking state of said memory means by detecting a predetermined low vehicle speed from the output signal of said first-mentioned vehicle speed detector means, and means connected to said memory means for operative connection to the automatic transmission of said vehicle to execute the shifting of the transmission gear-shifting mechanism thereof in accordance with the output signal of said memory means.

5. An automatic transmission control system for vehicles having engines and using automatic transmissions having gear-shifting mechanisms, comprising:

vehicle speed detector means for operative connection to said vehicle for producing an output signal proportional to the vehicle speed, gear-shift signal generator circuit means connected to said detector means for producing different speed change signals in accordance with predetermined characteristics depending on the values of at least said output signal from said detector means, memory means connected to and producing an output signal in accordance with the output signal of said gear-shift signal generator circuit means, means connected to said memory means for causing the output signal of said memory means to be locked upon the occurrence of certain conditions, vehicle low speed detector means connected between said first mentioned speed detector and memory means for producing an output signal for releasing the output-locking state of said memory means by detecting a predetermined low vehicle speed from the output signal of said first-mentioned vehicle speed detector means, and means connected to said memory means for operative connection to the automatic transmission of said vehicle to execute the shifting of the transmission gear-shifting mechanism thereof in accordance with the output signal of said memory means.

* * * * *